United States Patent [19]

Sonoda

[11] Patent Number: 4,967,274
[45] Date of Patent: Oct. 30, 1990

[54] IMAGE DATA CONVERSION DEVICE

[75] Inventor: Fumihiro Sonoda, Kanagawa, Japan

[73] Assignee: Fuji Photo Film Co., Ltd., Kanagawa, Japan

[21] Appl. No.: 203,839

[22] Filed: Jun. 3, 1988

[30] Foreign Application Priority Data

Jun. 9, 1987 [JP] Japan .................................. 62-142369

[51] Int. Cl.⁵ ............................................. H04N 5/14
[52] U.S. Cl. ...................................... 358/160; 364/521
[58] Field of Search .................... 358/160, 22; 364/521

[56] References Cited

U.S. PATENT DOCUMENTS 4,533,952 8/1985 Norman, III ......................... 358/160
4,675,842 6/1987 Szenes et al. ........................ 340/750
4,790,025 12/1988 Inoue et al. .......................... 340/724

FOREIGN PATENT DOCUMENTS 2100956 1/1983 United Kingdom ................ 358/160

Primary Examiner—James J. Groody
Assistant Examiner—David E. Harvey
Attorney, Agent, or Firm—Sughrue, Mion, Zinn, Macpeak & Seas

[57] ABSTRACT

In an image data conversion device having an image data memory for storing and outputting picture element data to provide reproduced images according to a DMA transmission system, address output means provides address data to specify memory addresses in the image data memory means in a predetermined order. Conversion means, in response, applies to a memory address to the image data memory means which may be different from the memory address specified by the address data, so that, for instance, the addresses of picture element data are directly changed in the DMA transmission.

8 Claims, 4 Drawing Sheets

IMAGE DATA CONVERSION DEVICE

BACKGROUND OF THE INVENTION

This invention relates to image data conversion devices, and more particularly to an image data conversion device which carries out a conversion process for the formation of images, such as changing the arrangement of picture element data or partially extracting picture element data.

One example of a conventional image data transmission device, as shown in FIG. 4, comprises: a central processing unit 1 including for instance a micro-computer: a tri-state buffer circuit 2 connected between the input/output port of the central processing unit 1 and a bus line 3, the circuit 2 being made conductive or non-conductive in response to a control signal CS from the central processing unit 1; a memory unit 4 connected to the bus line 3 and having a RAM (random access memory); and an interface circuit 5 interposed between the bus line 3 and an external device such as a monitor television set. The interface circuit 5 applies a request signal REQ to the central processing unit 1 when required.

The above-described image data transmission device is based on a so-called "DMA (direct memory access) transmission system". When, as shown in part (a) of FIG. 4, a signal REQ requesting the tri-state buffer circuit 2 to be made conductive is applied to the central processing unit 1 by the interface circuit 5, the control signal CS is supplied to the tri-state buffer circuit 2 by the central processing unit 1 so as to make the tri-state buffer circuit 2 conductive, thus permitting data transmission between the central processing unit 1 and the interface circuit 5 and the memory unit 4. On the other hand, when, as shown in part (b) of FIG. 4, a so-called "DMA request" is made to the central processing unit 1 with the aid of a request signal REQ, the control signal CS is applied to the tri-state buffer circuit 2 by the central processing unit 1 so that the tri-state buffer circuit 2 is rendered non-conductive (or high in impedance), thus inhibiting data transmission between the central processing unit 1 and the interface circuit 5 and the memory unit 4. Upon the DMA grant, data can be transmitted directly between the interface circuit 5 and the memory unit 4, and therefore an external device (not shown) can access the memory unit 4 through the interface circuit 5 for transmission of data.

Thus, in the transmission of data, it is unnecessary for the external device to use the central processing unit 1. This means that the time required for the transmission of data is greatly reduced. The system is considerably effective in an image reproducing apparatus in which image data stored in a memory unit (4) are transmitted to an external device such as a monitor television set.

However, the above-described image data transmission device is still disadvantageous in the following points: In the conventional image data transmission device, the image data are sequentially transmitted while in the memory unit the address regions are renewed one after another in one or the opposite direction. Therefore, the device cannot meet the requirement that the image data be changed in arrangement or partially extracted to quickly reproduce a modified image as required. That is, the DMA transmission system can transmit image data at high speed, but cannot change the arrangement of image data. If it is required to change the arrangement of image data according to the DMA transmission system, it is necessary to process the data under program control of a central processing unit such as a micro-computer, and therefore the data processing speed will be considerably low.

SUMMARY OF THE INVENTION

In view of the foregoing, an object of this invention is to provide an image data conversion device which, in a DMA transmission mode, can effect various data conversions such as changing the arrangement of the image data or extracting some of the image data at high speed.

The foregoing object and other objects of the invention have been achieved by the provision of an image data conversion device having image data memory means for storing or outputting picture element data to form reproduced images according to a DMA transmission system, which, according to the invention. comprises: address output means for providing address data to specify memory addresses in the image data memory means in a predetermined order; and conversion means for applying, when address data is provided by the address output means, a memory address to the image data memory means which is different from the memory address in the image data memory specified by the address data.

The manner in which the foregoing objects and other objects are achieved by this invention will become more apparent from the following detailed description and the appended claims when read in conjunction with the accompanying drawings.

DETAILED DESCRIPTION OF THE PREFERRED EMBODIMENT

One example of an image data conversion device according to this invention will be described with reference to the accompanying drawings.

Figure 1:
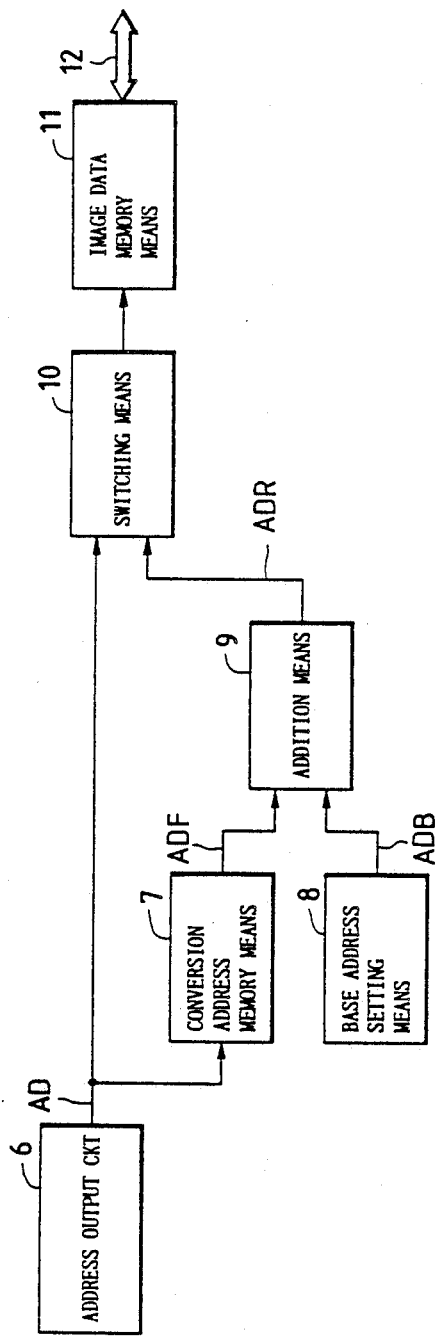
FIG. 1 is a block diagram showing one example of an image data conversion device according to this invention.

The image data conversion device, as shown in FIG. 1, comprises: an address output circuit 6; conversion address memory means 7; base address setting means 8; addition means 9 switching means 10; and image data memory means 11.

The address output circuit 6 outputs address data AD in the same order as the picture element data of one frame are horizontally scanned. The conversion address memory means 7 has, for instance, a conversion table for converting the address data AD into predetermined conversion address data ADF. The conversion table is made up of a RAM (random access memory) or ROM (read-only memory). The base address setting means 8 comprises registers, to set and output an integer ADB (hereinafter referred to as "base address data", when applicable). In the addition means, the conversion address data ADF and the base address data are subjected to addition to provide a further conversion address data ADR. The conversion address data ADR outputted by the addition means 9 and the address data AD provided by the address output circuit 6 are applied to the switching means 10, so that one of the data ADR and AD is supplied, as an address signal, to the image data memory means 11. The switching means 10 comprises a multiplexer circuit. The image data memory means 11 is made up of a RAM (random access memory) which can store picture element data corresponding in number to one frame. The image data memory means 11 similarly as in the case of FIG. 4, applies the picture element data at the address region which is specified by the address data (address signal) received from the switching means 10 to a bus line 12, or writes in the address region picture element data provided through the bus line 12.

Figure 2:
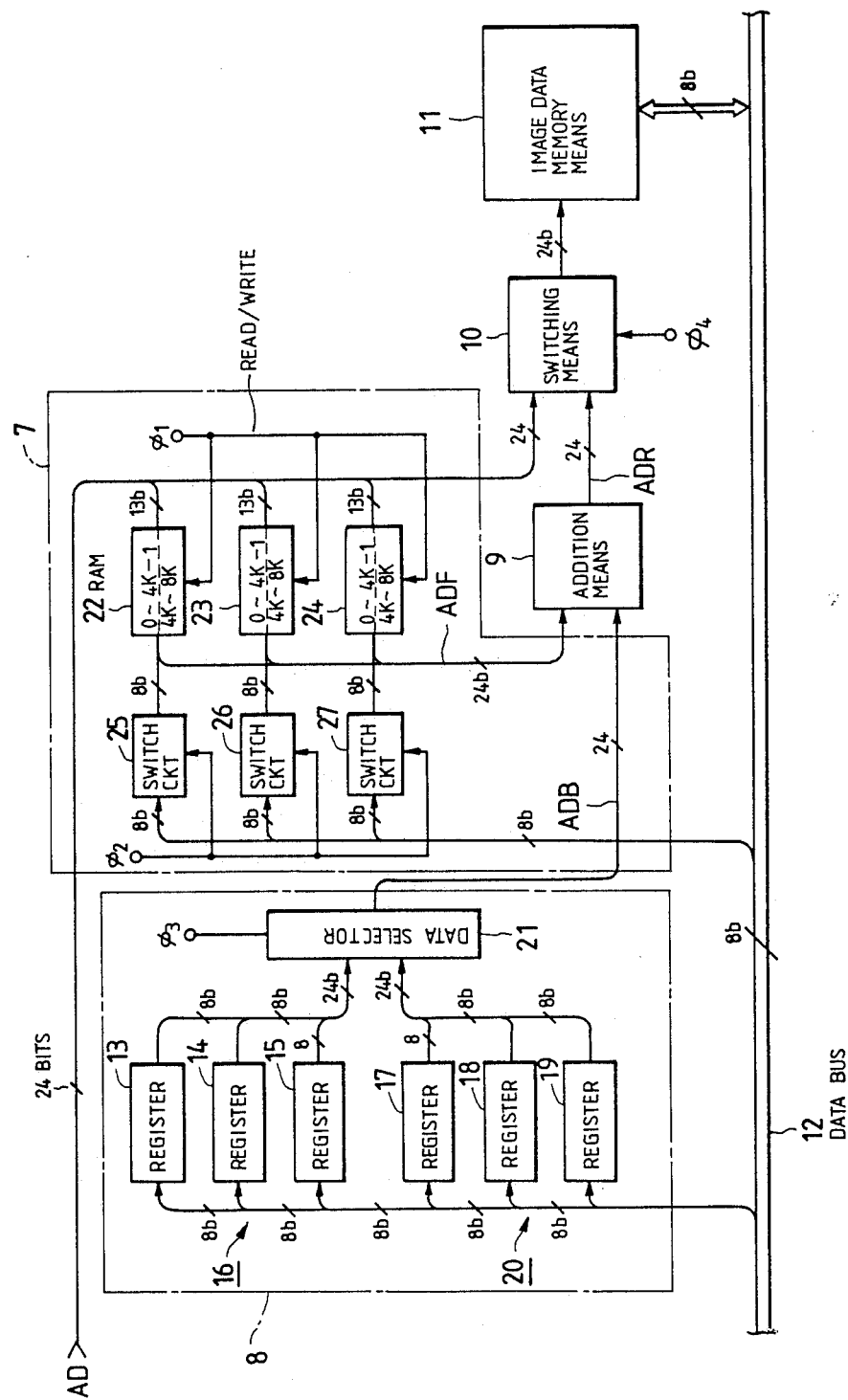
FIG. 2 is a block diagram showing the arrangement of the image data conversion device in more detail.

The image data conversion device is shown in FIG. 2 in more detail. In FIG. 2, the base address setting means 8 is encircled by the one-dot chain line, and the conversion address memory means 7 is surrounded by the two-dot chain line.

The base address setting means 8, as shown in FIG. 2, comprises: a first register 16 made up of three register circuits 13, 14 and 15 each having an 8-bit capacity a second register 20 made up of three register circuits 17, 18 and 19 each having an 8-bit capacity; and a data select circuit 21. In the first register 16, the register circuits 13, 14 and 15 collectively hold a 24-bit address. In the second register 20, the register circuits 17, 18 and 19 hold a 24-bit address. In other words, in the first register 16, the register circuit 15 holds eight low-order bits; the register circuit 14, eight middle-order bits; and the register circuit 13, eight high-order bits. In the second register 20, the register circuit 19 holds eight low-order bits; the register circuit 18, eight middle-order bits: and the register circuit 17, eight high-order bits. The register circuits 13 through 15, and 17 through 19 read address data from the 8-bit data bus 12 three times to collect a 24-bit address. The first register 16 holds the base address data ADB for a memory mode when picture element data are loaded in the image data memory means 11, whereas the second register 20 holds the base address data ADB for an output mode when the image data memory means 11 applies picture element data to the data bus 12.

The data select circuit 21 performs a switching operation in response to a switching control signal $\phi_3$ so that in the memory mode the base address data of the first register is transmitted to the addition means 9, and in the output mode the base address data of the second register is transmitted to the addition means 9.

In FIG. 2, numerals with the suffix "b" designate the number of bits transmitted on the corresponding signal line.

The conversion address memory means 7, as shown in FIG. 2, comprises, three RAMs (random access memories) 22, 23 and 24: and switch circuits 25, 26 and 27 for transmitting data from the data bus 12 to the RAMs 22, 23 and 24, respectively. The RAMs 22, 23 and 24 each have an 8-kilobyte capacity. A predetermined number, e.g. thirteen (13) bits of the 24-bit address data AD provided by the address output circuit 6 are applied to the RAMs 22, 23 and 24 so that 8-bit memory regions therein are specified simultaneously. In other words, the same addresses are simultaneously specified by the thirteen bits of address data AD, so that the 24-bit conversion address data ADF is outputted. In this case, the RAM 24 holds eight (8) low-order bits, the RAM 23, eight middle-order bits, and the RAM 22, eight high-order bits. In each of the RAMs 22, 23 and 24, the first half of the memory regions (specified by address data 0 through 4095) are used to hold the conversion address data ADF in the memory mode, and the second half (specified by address data 4096 through 8192) are used to hold the conversion address data ADF in the output mode.

In response to a switching control signal $\phi_2$, the switch circuits 25, 26 and 27 are rendered conductive or non-conductive (high in impedance). When the switch circuits 25, 26 and 27 are rendered conductive, the conversion address data ADF provided through the data bus 12 is loaded in the RAMs 22, 23 and 24 through the switch circuits 25 26 and 27, eliminating the previous conversion address data ADF. When the conversion address data has been loaded in the RAMs, the switch circuits 25, 26 and 27 are rendered non-conductive in response to the control signal $\phi_2$, so that the RAMs 22, 23 and 24 are disconnected from the data bus 12. The 24-bit conversion address data ADF read out of the RAMs 22, 23 and 24 is supplied to the addition means 9. The data reading operation and the data writing operation of the RAMs 22, 23 and 24 is switched by a read/write signal $\phi_1$ which is provided in association with the control signal $\phi_2$.

The addition means 9 is made up of an arithmetic circuit for adding binary data. The conversion address data ADR provided by the addition means or the address data AD is supplied through the switching means 10 to the image data memory means 11. The image data memory means 11 is made up of a RAM (random access memory) with a storage capacity of 16 megabytes for storing for instance red (R), green (G) and blue (B) hue data for the reproduction of color images, and can specify these data at random with the aid of the 24-bit conversion address data ADF or address data AD. The image data memory means 11 is designed so that picture data can be transmitted between the memory means 11 and the data bus.

Figure 3:
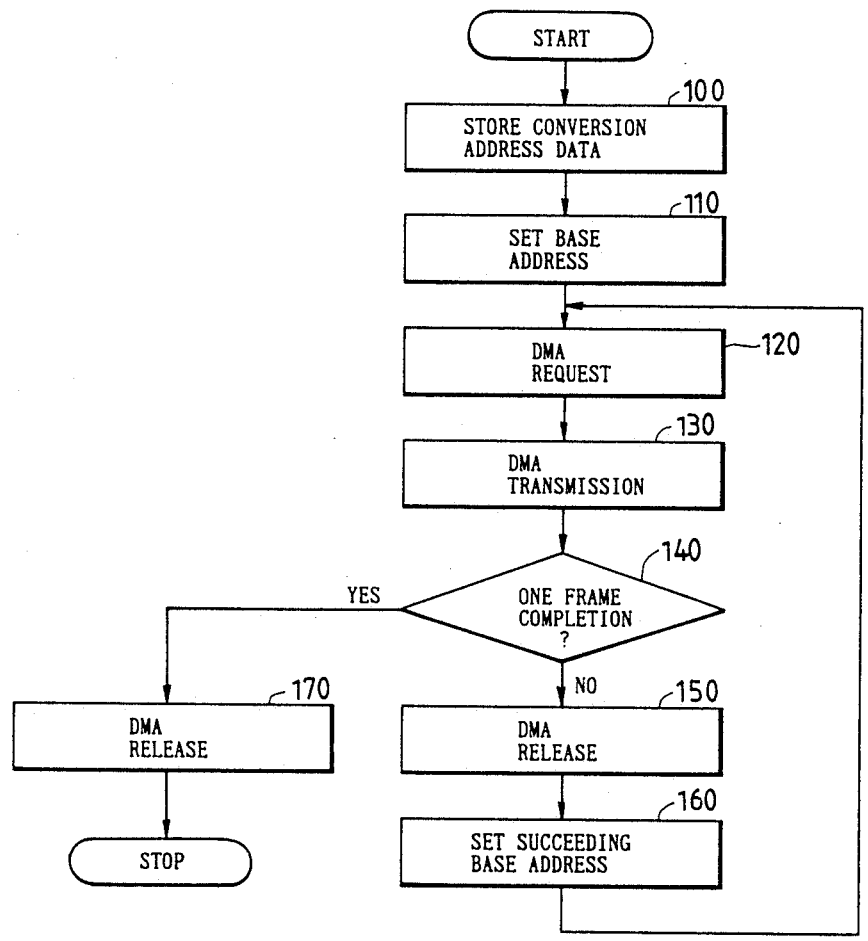
FIG. 3 is a flow chart describing one operation of the image data conversion device.

The operation of the image data conversion device shown in FIG. 2 will be described with reference to the flow chart of FIG. 3. In this case, the picture element data for one frame have been stored in the image data memory means and are changed in arrangement before being applied to a monitor television set or the like.

First in routine 100, the conversion address data ADF is stored in the RAMs 22, 23 and 24 of the conversion address memory means. That is, the switch circuits 25, 26 and 27 are rendered selectively conductive so that the conversion address data ADF is stored, with the RAMs being addressed by the address data AD.

In this operation, the address data AD and the conversion address data ADF are provided by a central processing unit 200 such as a micro-computer. The number of conversion address data ADF thus stored correspond to the number of picture elements per horizontal scanning operation. Therefore, in the case of a color image, three different picture element data, namely, red, green and blue picture element data are used to provide color, and, for each hue, 1024 picture elements are reproduced per horizontal scanning operation, whereby 3072 conversion address data are stored. Upon the completion of storage, the switch circuits 25, 26 and 27 are respectively rendered non-conductive.

Next, in routine 110, the base address data ADB is stored with the aid of the base address setting means. In other words, the base address data ADB transmitted over the data bus 12 is stored in the second register 20 in FIG. 2. In this operation, the address data ADB is transmitted from the central processing unit.

The transfer of data from the CPU 200 to the image data conversion device can be termed a CPU program address conversion data mode of operation.

Figure 4A:
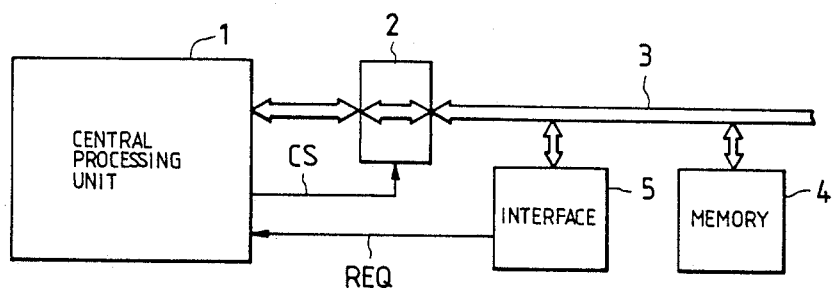
FIGS. 4a and 4b are block diagrams showing one example of a conventional image data transmission device according to a DMA transmission system.
Figure 4B:
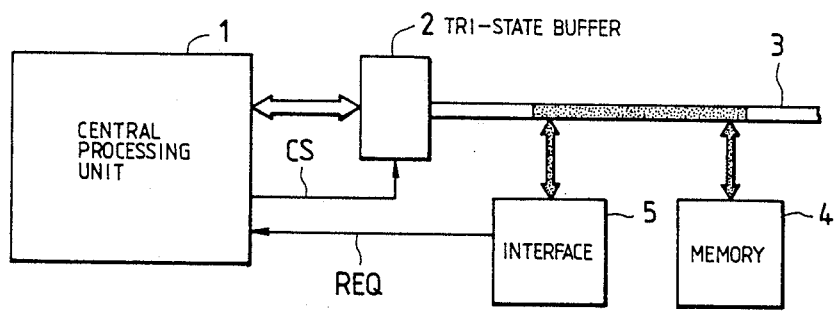

In routine 120, a DMA (direct memory access) request is made to the central processing unit, similarly as in the conventional image data conversion device shown in FIG. 4.

Thus, the DMA transmission over the bus line 12 is permitted. This DMA transmission may be termed a DMA transmission mode of operation. Thereupon, in routine 130, for every picture element, the output operation is carried out by the DMA transmission. That is, the data select circuit 21 is operated so that the base address data ADB is supplied to the addition means 9 from the second register 20, while the initial address data AD from the address output circuit 6 (FIG. 1) is applied to the conversion address memory means 7 so that the conversion address data ADF is supplied to the addition means 9 beginning with predetermined top addresses of the RAMs 22, 23 and 24. As a result, the addition means 9 provides the conversion address data ADR, which specify addresses in the image data memory means 11. The picture element data in the addresses thus specified are transmitted through the data bus 12 to an external device.

As is well known in the art, the address data AD provided by the address output circuit 6 is increased (or decreased) one count at a time. Therefore, the picture element data are successively read out. This reading operation is carried out as many times as the number of picture elements on one horizontal line (corresponding to one horizontal scanning operation) of one frame or on one vertical line.

Next, in routine 140, it is determined whether or not the reading of picture element data corresponding to one frame has been achieved. If the reading operation is not accomplished yet, then in routine 150 a request signal for releasing the DMA transmission is applied to the central processing unit, and the following routine 160 is effected under control of the central processing unit.

In routine 160, the operation is the same as that in routine 110; that is, base address data ADB indicating the next reading line number is set in the second register 20. Then, routine 120 is effected again so that the picture element data of the line indicated by the base address data ADB are read out of the image data memory means 11.

The above-described operations are repeatedly carried out. And when, in routine 140, it is detected that all the picture element data corresponding to one frame have been read out, then routine 170 is effected. In routine 170, the DMA transmission mode is released.

As is apparent from the above description, in the invention the picture element data are read out via a DMA transmission system. Therefore the picture element data can be transmitted for instance to an external device from the image data memory means at high speed. In addition, the picture element data can be read out in a desired order according to the conversion address data ADR set in the conversion address memory means 7 in advance. Therefore, if the conversion address data are suitably set, an axially symmetrical or rotated image can be provided using the picture element data of the image data memory means 11, or a so-called "window view" process can be achieved at high speed in which some of the picture element data stored in advance are selectively read out for enlargement or reduction of the reproduced image.

In reproducing images on a monitor television set, red, green and blue picture element data are repeatedly read by so-called "point sequential scanning". However, the technical concept of the invention is applicable for instance to a color printer for providing so-called "color hard copies" by "plane sequential scanning" in which red dots are first printed using red picture element data for one frame, green dots are printed using green picture element data for the same frame, and finally, blue dots are printed by using blue picture element data.

The picture element data reading operation has been described with reference to the flow chart of FIG. 3; however, the technical concept of the invention is applicable to the case where picture element data supplied from an external device are stored in the image data memory means 11 by the DMA transmission system with the arrangement unchanged. In the latter case, the operation can be readily understood from the above description made with reference to FIG. 3.

As was described above, in the invention, during the DMA transmission the arrangement of picture element data can be changed, and therefore a desired conversion of data can be obtained in real time.

The contents of the data held by the conversion address memory means 7 and the base address setting means 8 are not limited to those which have been described above.

As was described above, an image data conversion device having an image data memory means for storing or outputting picture element data to form reproduced images according to a DMA transmission system, according to the invention, comprises: the address outputting means for providing address data to specify memory addresses in the image data memory means in a predetermined order: and conversion means for applying, when address data is provided by the address output means, a memory address to the image data memory means which is different from the memory address in the image data memory means specified by the address data so that the arrangement of the picture element data can be changed with ease. Therefore, the image data conversion device of the invention can achieve an image processing operation at high speed, thus contributing greatly to an improvement in the performance of video equipment such as video tape recorders and electronic cameras.

What is claimed is:

1. An image processing system comprising a CPU and an image data conversion device which, while operating in a DMA transmission mode, can effect various image data conversions, said image data conversion device comprising:

image data memory means for storing picture element data and for outputting stored element data in response to a memory address signal;

a data bus for transmitting program address conversion data from the CPU only during a CPU program transmission mode and for receiving stored picture element data outputted from said image data memory means only during the DMA transmission mode, stored picture element data outputted by said image data memory means via said data bus during the DMA transmission mode representing a reproduced image;

address output means for providing address data specifying memory addresses in said image data memory means in a predetermined order; and conversion means coupled to said data bus for receiving program address conversion data during the CPU program transmission mode, said conversion means being selectively programmed according to the received program address conversion data for each operation in a DMA transmission mode, to effect, while operating in a DMA transmission mode, desired memory address conversions, said programmed conversion means supplying, during the DMA transmission mode and in response to address data provided by said address output means, a memory address which is different from the memory address specified by said address data to effect a desired image data conversion in accordance with the received program address conversion data.

2. A system as claimed in claim 1, in which said address output means provides a plurality of address data specifying picture element data corresponding to one horizontal scan of an image frame.

3. A system as claimed in claim 1, in which said conversion means comprises:

conversion address memory means selectively programmed with conversion address data via said data bus for each operation in a DMA transmission mode, to effect, while operating in a DMA transmission mode, desired memory address conversions, for providing conversion address data in response to address data provided by said address output means, said conversion address data addressing a memory address which is different from the memory address specified by said address data;

base address register means selectively programmed with integer data supplied via said data bus during the CPU program transmission mode for each operation in a DMA transmission mode; and adding means for adding said conversion address data and said integer data and applying the sum to said image data memory means.

4. A system as claimed in claim 3, wherein the picture element data stored in said image data memory means represents a scanned input picture image signal, and wherein said integer data represents a horizontal scan line of the scanned input picture image signal.

5. A system as claimed in claim 3, wherein said base address register means comprises a plurality of registers each storing a part of a base address for use during an operation of said device in either a memory mode in which picture element data is loaded into said image data memory means or an output mode in which stored picture element data is read from said image data memory means, and data selector means for selecting outputs of said registers for application to said adding means.

6. A system as claimed in claim 3, further including a data bus coupled to said base address register means for loading said registers, coupled to said conversion address memory means for loading said conversion address data, and coupled to said image data memory means for input/output of image data.

7. An image processing system comprising a CPU and a data conversion device which, while operating in a DMA transmission mode, can effect various image data conversions, said image data conversion device comprising:

image data memory means for storing picture element data;

a data bus for transmitting program address conversion data from the CPU during a CPU program transmission mode, and for outputting stored picture element data from said image data memory means during the DMA transmission mode, stored picture element data outputted by said image data memory means representing a reproduced image;

address output means for providing address data specifying memory addresses in said image data memory means in a predetermined order;

conversion means coupled to said data bus for receiving program address conversion data during the CPU program transmission mode, said conversion means being selectively programmed according to the received program address conversion data for each operation in a DMA transmission mode, to effect, while operating in a DMA transmission mode, desired memory address conversion, said programmed conversion means supplying, during the DMA transmission mode and in response to address data provided by said address output means, a memory address which is different from the memory address specified by said address data to effect a desired image data conversion in accordance with the received address conversion data, said conversion means including conversion address memory means for storing, in advance, one of predetermined conversion address data and arbitrary conversion address data.

8. An image processing system comprising a CPU and a data conversion device which, while operating in a DMA transmission mode, can effect various image data conversions, said image data conversion device comprising:

image data memory means for storing picture element data;

a data bus for transmitting program address conversion data from the CPU during a CPU program transmission mode and for outputting stored picture element data from the image data memory means during the DMA transmission mode, stored picture element data outputted by said image data memory means representing a reproduced image;

address output means for providing address data specifying memory addresses in said image data memory means in a predetermined order;

conversion means coupled to said data bus for receiving program address conversion data during the CPU program transmission mode, said conversion means being selectively programmed according to the received program address conversion data for each operation in a DMA transmission mode, to effect, while operating in a DMA transmission mode, desired memory address conversions, said programmed conversion means supplying, in response to address data provided by said address output means, a memory address which is different from the memory address specified by said address data to effect a desired image data conversion in accordance with the received address conversion data; and a switching means for selecting one of address data from the address output means and converted address data from the conversion means to supply an output signal to the image data memory means.

* * * * *